(12) United States Patent
Frankel et al.

(10) Patent No.: US 10,913,477 B2
(45) Date of Patent: Feb. 9, 2021

(54) ROLLER COMPONENT AND TROLLEY

(71) Applicant: Zenithen USA LLC, Upland, CA (US)

(72) Inventors: Andrew David Frankel, Yorba Linda, CA (US); Shi-Ping Zheng, Fuzhou (CN); Tian-Xia Zheng, Fujian (CN)

(73) Assignee: Zenithen USA, LLC, Upland, CA (US)

( * ) Notice: Subject to any disclaimer, the term of this patent is extended or adjusted under 35 U.S.C. 154(b) by 169 days.

(21) Appl. No.: 16/281,281

(22) Filed: Feb. 21, 2019

(65) Prior Publication Data

US 2020/0269898 A1 Aug. 27, 2020

(51) Int. Cl.
*B62B 5/04* (2006.01)
*B62B 3/02* (2006.01)

(52) U.S. Cl.
CPC ............ *B62B 5/0461* (2013.01); *B62B 3/022* (2013.01)

(58) Field of Classification Search
CPC .............................. B62B 5/0461; B62B 3/022
See application file for complete search history.

(56) References Cited

U.S. PATENT DOCUMENTS

| | | | | |
|---|---|---|---|---|
| 5,390,942 A | * | 2/1995 | Schuster | B62B 5/04 280/19 |
| 5,979,917 A | * | 11/1999 | Thogersen | B60B 33/0018 280/47.34 |
| 6,219,881 B1 | * | 4/2001 | Wen | B60B 33/0018 16/35 R |
| 2010/0102526 A1 | * | 4/2010 | Schwager | F16D 49/00 280/47.24 |

* cited by examiner

*Primary Examiner* — Bryan A Evans
(74) *Attorney, Agent, or Firm* — Merek, Blackmon & Voorhees, LLC

(57) ABSTRACT

A roller component and trolley. The trolley component includes the positioning seat, braking part, and roller that are respectively installed on the guiding shaft. The end of the shaft ring is cam surface, putting or relieving pressured to the end of the rollers when bring rotated, forming the braking structure; the trolley includes front bar, rear bar, bottom bar, handle bar, and flexible bag. The roller components are installed on the two sides of the guiding shaft under the rear bar, providing support and facilitating braking of the trolley.

10 Claims, 8 Drawing Sheets

ROLLER COMPONENT AND TROLLEY

BACKGROUND OF THE INVENTION

Field of the Invention

This invention relates to a roller component and a trolley, especially rollers with braking functions as well as trolley with such roller components. This trolley may be made with flexible fabrics such as mesh fabric and oxford cloth.

Technical Background

The current foldable trolleys are light and foldable, which has made them a well-received, must have for family shopping. For example, CN201520690086.5 shows a public kind of foldable trolley that includes a basket, handles and rollers. The basket includes a front frame, a rear frame, a bottom frame, and connectors for the front and rear frames. Connecting rods that support the frontal part of the bottom frame are located on each side of the handle below the bottom frame. This foldable trolley is also a typical example for the many trolleys in the current market. To achieve better folding experience, the front and rear frames can only use a connecting rod, not materials with dense eyelets such as mesh fabric. Therefore, smaller and flat objects cannot be placed in the trolley, as they might easily drop because of vibration during towing, which is also the biggest drawback of this kind of trolleys.

For this, CN201720162611.5 publishes a magnetic net trolley which includes the trolley itself, including a bottom panel, front panel, rear panel, left and right panels. One side of the left and right panels is hinged with the vertical bars on the two sides of the front panel, while the other side is a free end. There is a horizontal bar connecting the upper part of the vertical bar and the rear vertical bar. The left panel and right panel are placed between the two horizontal bars while the free ends are magnetically fixed with the corresponding horizontal bars. The bottom panel, front panel, rear penal, and the right panel of this patent use denser mesh plates that can accommodate smaller objects. To facilitate the folding process, one side of the left and right panels are hinged while the other side is a magnetic free end. The connection between the horizontal bars is thereby achieved. This trolley is creative but is less convenient to use.

Rollers with braking function are not usually seen in trolleys but are more common in luggage and baby carriers, though usually with complicated roller supporting structure. Typical examples include Chinese patent 012330841, which has luggage roller brakes and patent 201120556269X, which has wheel components. This cannot be used on trolleys considering the cost.

Therefore, a more accessible roller structure with a braking function and its application on trolleys is a goal of this invention.

SUMMARY OF THE INVENTION

This invention aims to create a kind or roller that, through the coordination of the convex ring of the end face axle sleeve and the locating block. Another aim is foldable trolleys equipped with this kind of rollers and flexible bag that can be tightened.

The technical proposal of the invention is achieved in one or more of the following ways:

A roller component is provided with the following features: It includes the roller, positioning block and braking brake parts. An axle sleeve is placed along the axle hole on the inner side of the roller. The outside edge of the axle sleeve is thinner on the middle with the end part in the shape of a convex ring. The positioning block includes an axle bed and a suspended claw and is fixed on the guide shaft through the roller's axle holes by the axle bed. The braking component has connected axle ring and pedals. The aperture is the same as that of the mentioned rollers, and the end of the axle ring is a cam surface. The braking component is installed between the positioning block and roller, and the cam surface is in contact with the axle set, so that the barking component can be forced to move along the axle, putting or relieving pressure to the end of the rollers convex ring. The pedal is located on the tangent of the axle ring, moving the ring rotationally.

The suspended claw and the convex ring share similar circular structures. The inner part of its outside end is in the shape of a chamfer claw. The outside edge of the convex ring is also in the shape of a chamfer ring. A fitting surface is thereby created. When fitting the rollers, the chamfer ring is put on the chamfer claw, forcing the latter to fit in, creating a movable positioning structure.

The contact surface between the axle bed and the cortex ring is called chamfer. Coordination between the cam face and the chamfer can reduce braking distance.

A kind of trolley that includes a front bar, rear bar, bottom frame, handle bars and the roller components. The mentioned roller components are places on the two side under the rear frame bar, with the following features:

The lower part of front and rear frame bars is hinged with the front and rear ends of the bottom frame. A connecting rod is hinged on the upper parts of each side of the front and rear frame bars, thus creating support for the front and rear frame bars and a parallelogram that can be folded.

A front horizontal bar is put under the handle bar. When the trolley is adequately opened, the front horizontal bar supports the lower part of the bottom frame. The handles lean backwards, while the middle part is hinged with the mid-rear part of the mentioned connecting rod.

A connecting rod whose front part is hinged with the lower part of the mentioned handles and rear part hinged on the side of the bottom frame. The connection that happens during the folding and unfolding is thereby created.

One bag is made with flexible fabrics. It is put on the bottom frame with at least two of its four sides hung on the front and rear frame bars.

Guiding shafts are placed under the rear frame bar. Roller components are placed on the end parts on the two sides of the shaft. From the outside to the inside, locating seat, braking part, and roller are installed, and the positioning part is riveted on the guiding shaft.

The handle bars are foldable, with an upper U-shaped bar and a lower U-shaped bar. The two Us are hinged together on their ends and a limit switch is placed against the back turn. The middle part of the lower U bar constitutes the front horizontal bar that supports the bottom frame. Guiding rollers are installed on the front horizontal bars.

The limit switch is a plastic hinge that includes the left and right parts and rivets that hold them together. The left and right parts are rotationally symmetrical. The disc end and the bar sleeve end located at the disc tangent are opened to contact the bottom of the disc end bar cover, so that the limit switch against back turn is created.

The positioning blocks has upward facing seats; the rear frame bar consists of a reversed U bar and guiding shaft. The reverse U bars have their two ends riveted in their seats. The connection between the reverse U bars and guiding shafts is reached through the positioning blocks and together they form the rear frame bars.

The front frame bar consists of a short U-shaped bar and two vertical bars hinged on the two ends of the U shaped bar. The upper end of the vertical bar is hinged with the frontal part of the connecting rod, alternatively with a plastic part in the middle. The lower part of the vertical bar is hinged on the supporting shafts on each side of the bottom frame. The bottom frame mentioned is in the shape of an H, with steel wires or steel wire gauze between the supporting shafts.

The front, rear frame bars and handle bars are foldable U-shaped bars. The bottom frame is in the shape of an H with supporting shafts on the two sides, with steel wires or steel wire gauze in the middle. The bottom frame is hinged with the ends of the reverse U through the supporting shafts. Front guiding rollers are installed under the handle bars.

The bags are in the shape of rectangular cylinders with two kinds of positioning structures: firstly, cloth covers on the four edges, which are installed on the parallel bars, so that the front and rear frame bars can keep the bag open; secondly, the bag is placed on the bottom frame, and at least two of the four edges are hung on the upper side of the front and rear frame bars.

The roller components offered by this invention only needs three parts to be installed on the guiding shaft easily with braking function. This is especially suitable for all kinds of simple trolleys. The trolleys that have these rollers also have foldable frames and flexible bags. The bags can accommodate small items and can be folded with the frame. Optimized foldable handles can be put outside of the frame; they do not take much space and can remain unfolded in the trolley. They can be put in the bag with the items they hold, so that trolleys will have wider application.

Figure 1:
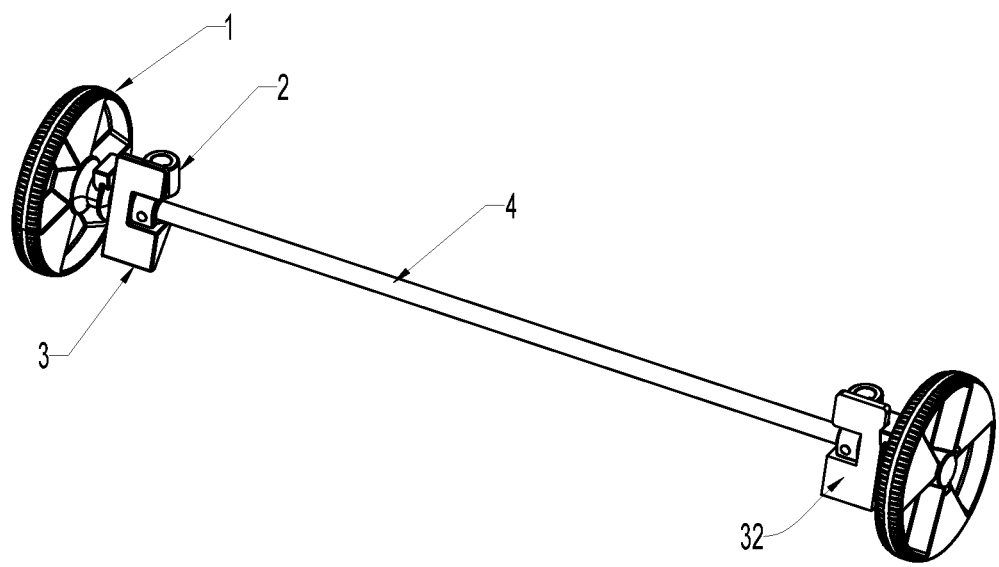
FIG. 1 is an illustration of roller components.

Similar reference characters denote corresponding features consistently throughout the attached drawings. Namely, in the drawings the following reference numbers refer to the following part:
1—roller
11—axle sleeve
12—convex ring
121—chamfer ring
2—positioning seat
21—axle seat
211—chamfer
22—suspended claw
221—chamfer claw
23—axle seat
3—braking rod
31—shaft ring
311—cam surface
32—pedals
4—guiding shaft
5—front frame bar
51—short U—shaped bar
52—vertical bar
6—rear frame bar
61—reverse U bar
7—bottom frame
71—supporting bar
72—steel wire
8—handle bar
81—upper U—shaped bar
82—lower U—shaped bar
821—front horizontal bar
822—front guiding roller
83—plastic hinge
831—disc end
832—bar sleeve end
833—outside end of bar sleeve
834—cylinder tenon
835—cylinder mortise
84—connecting bar
85—connecting bar
851—extended part
86—plastic part
9—bag
91—cloth cover

DETAILED DESCRIPTION OF THE PREFERRED EMBODIMENT(S)

Figure 2:
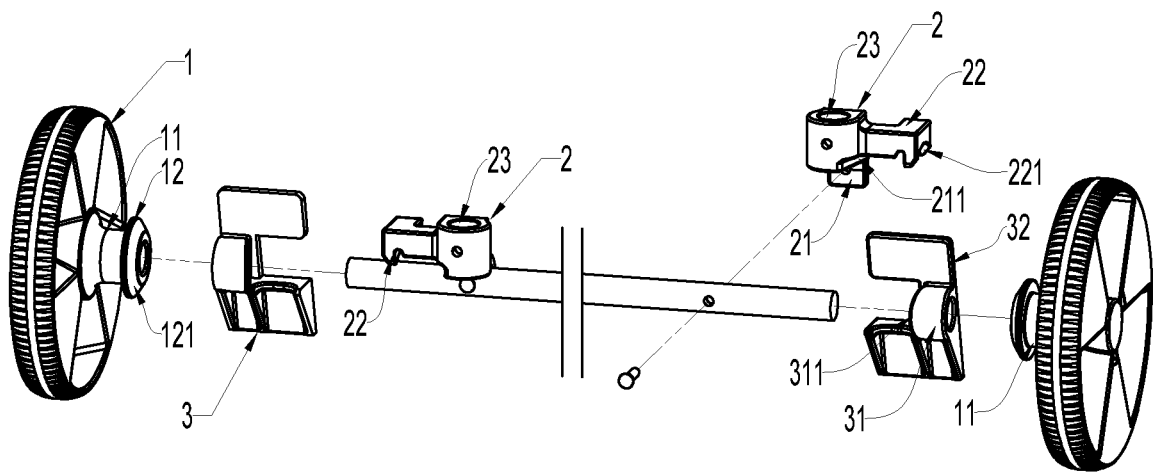
FIG. 2 illustrates a detailed illustration of the roller components.
Figure 3:
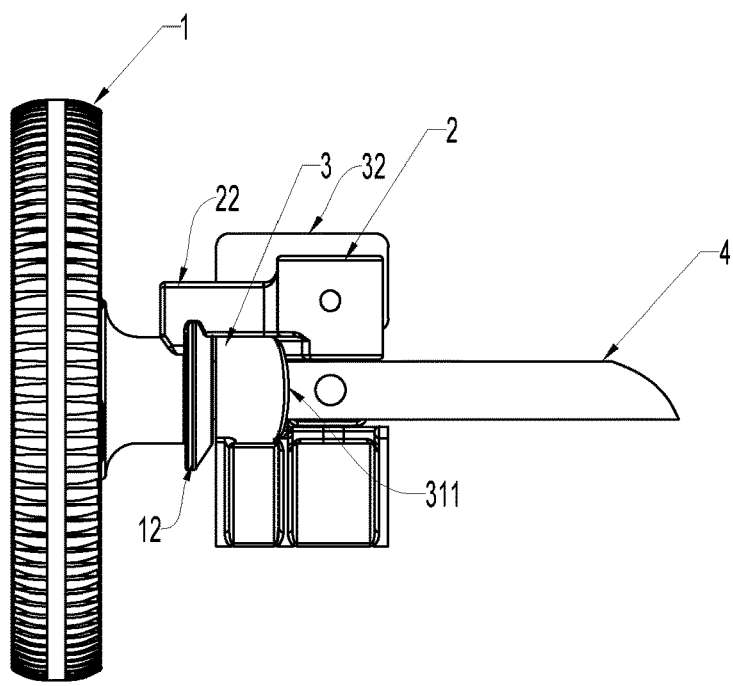
FIG. 3 illustrates the back of the rollers.
Figure 4:
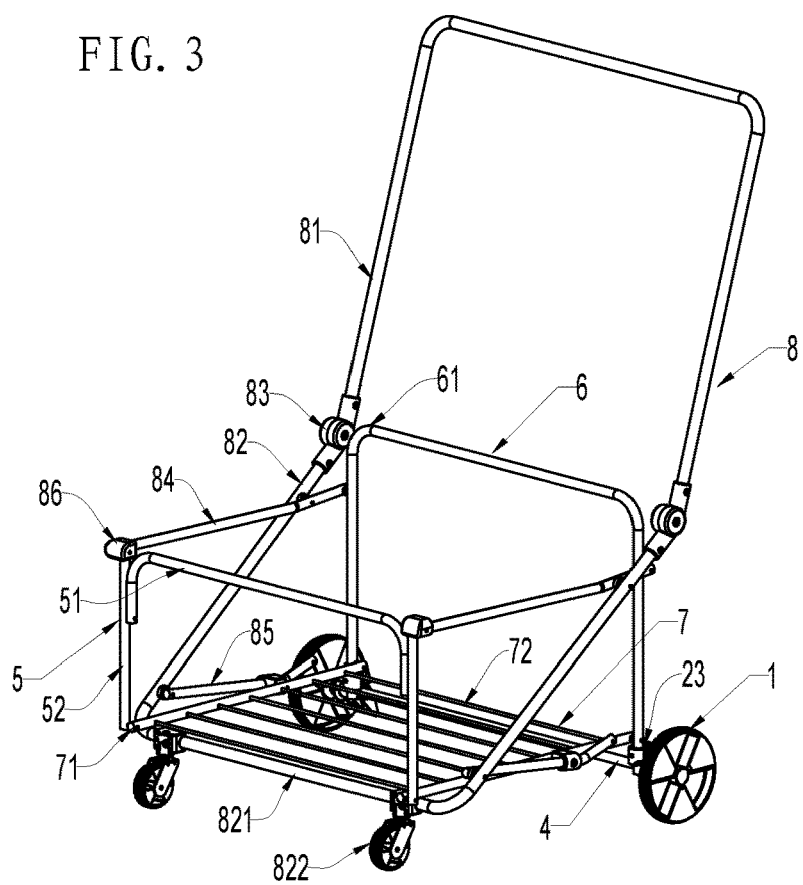
FIG. 4 illustrates the frame of the trolleys.
Figure 5:
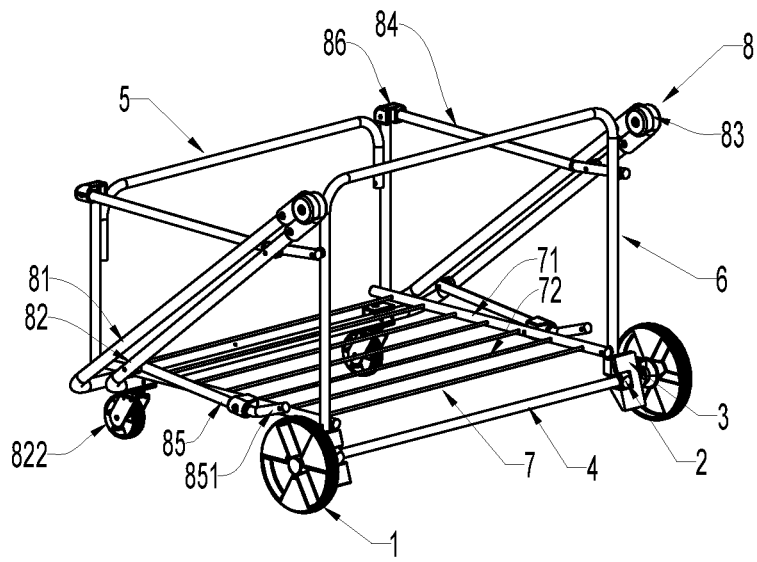
FIG. 5 illustrates the folding of the handles.
Figure 6:
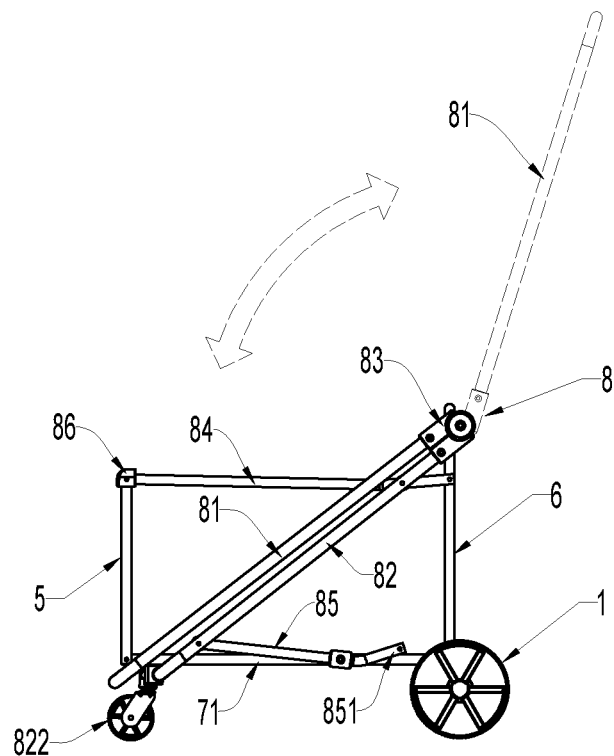
FIG. 6 shows one side of the handle folding process.
Figure 7:
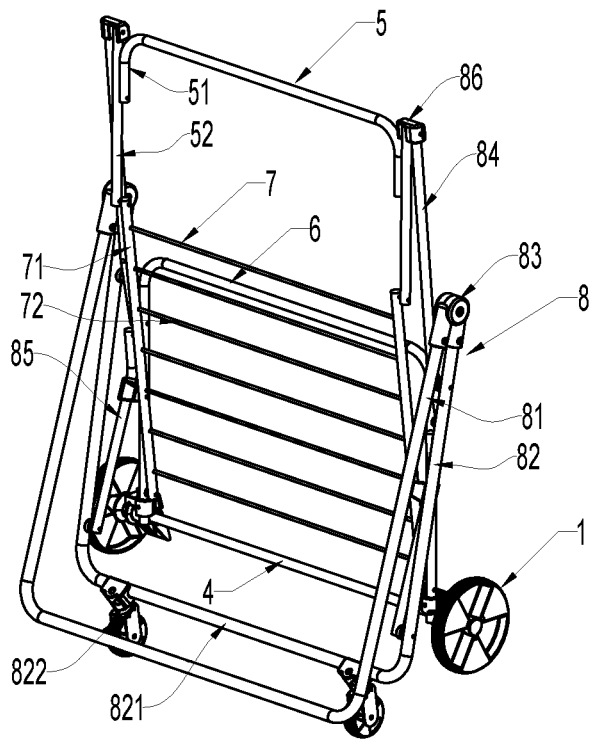
FIG. 7 illustrates the folded trolley.
Figure 8:
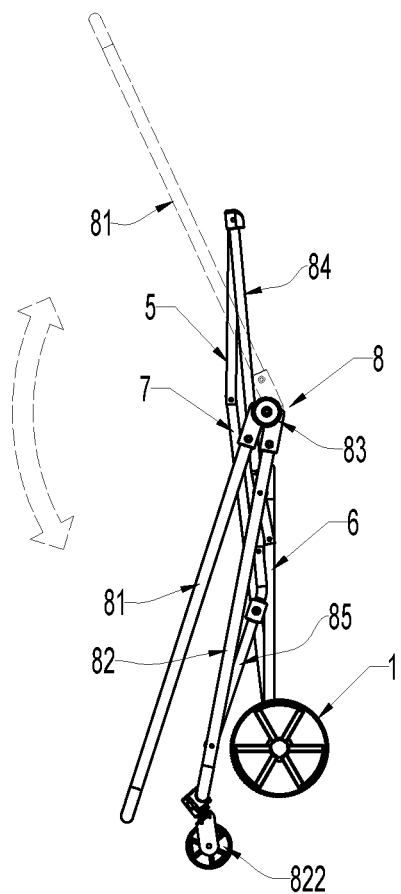
FIG. 8 shows one side of the trolley when it's folded.

Referring to FIGS. 1, 2, and 3, roller components, roller 1, positioning block 2, and braking component 3 are shown. Axle sleeve 11 is placed along the axle hole on the inner side of roller 1. The outside edge of the axle sleeve 11 is thinner in the middle and with the end part in the shape of a convex ring 12. The axle hole can either be a through-hole or a blind hole. According to weight bearing need, axle bearings or copper sleeves can be added in the axle hole to reduce wear with guiding shaft 4.

Positioning block 2 has an axle seat 21 and suspended claw 22. It is fixed on the roller axle hole and guiding shaft 4 with the help of axle seat 21. The suspended claw 22 is placed on convex ring 12, providing movable positioning for roller 1. The suspended claw and the convex ring share similar circular structure. The inner part of its outside end is in the shape of a chamfer claw 221; the outside of the convex ring 12 is also in the shape of a chamfer ring 121. A fitting surface of the convex ring 121 and the chamfer claw 221 is thereby created. When fitting roller 1, the chamfer ring 121 is put on the chamfer claw 221 of the suspended claw, forcing the suspended claw 22 to fit in, simplifying the roller assembly process. In this example, the axle seat 21 of the positioning seat 2 has an open structure and can be designed into an axle ring to be sheathed and riveted on guiding shaft 4.

Braking component 3 has connected axle ring 31 and pedal 32. The aperture of the axle ring 31 and that of the roller 1 are the same, and the end part of axle ring 31 is the cam surface 311. Braking part 3 is installed on positioning seat 2 and roller 1, and the cam surface 311 is in contact with the axle seat 21. Braking component 3 can be forced to move along the axle, to achieve or relieve pressure against roller convex ring 12, so that braking and its relieving are achieved. Pedal 32 is put on the tangent of axle ring 31, and axle ring 31 is put into rotation by pedal 32.

In order to reduce the braking distance, where the positioning block 2 and cam surface 331 of the braking axle ring contact is chamfer 211. Coordination between the cam surface 311 and the chamfer 211 can reduce the rotation angle to achieve greater movement along the axle.

Example 1

Referring to FIGS. 4 to 11, this example is a foldable trolley that can be put into the bag, especially when it has objects inside. When the handles are folded, the trolley can be entirely put into the bag. It has the following structural features:

A kind of trolley that includes the roller components mentioned. It also includes front frame bar 5, rear frame bar 6, bottom frame bar 7, handle bars 8, and bag with flexible fabrics 9, as well as connecting rod 84 that connects the front and rear frame bars 5 and 6, connecting rod 85 that connects the lower part of the handle bar 8 and the side of the bottom frame 7. Front basket bar 5, rear basket bar 6, and handle bar 8 are rectangular or triangular frames formed by bars. The bottom frame 7 is in the shape of an H; its two sides are supporting bars 71, and steel wires 72 or steel wire gauze connect the supporting bars 71, providing enough support for bag 9. Bag 9 is made with flexible materials, its bottom put on bottom frame 4. Two of the four edges of the bag are hung on bars 5 and 6 of the front and rear basket bars and can be open of folded.

More specifically, the front bar 5 consists of a short U-shaped bar and two vertical bars 52 hinged on ends of the short U bar. The upper part of the vertical bar 52 is hinged with the frontal part of connecting bar 84, or with a plastic part 86 in the middle on the frontal part of connecting bar 84 before it's hinged with the vertical bar 52. In this way, the difficulty for short U bar 51 to bend and reach the hinge and the vertical bar 52 and connecting rod 84 can be on the same height, not taking too much space. With plastic 86 covering the ends of bar 52 and connecting rod 84, for better protection for users and so the bag can be reached. The lower part of the vertical bar 52 is hinged on the supporting bar 71 on the two sides of the bottom frame.

The rear bottom bar 6 is a rectangular frame formed by U-shaped bar 61 and guiding shaft 4, and there is a positioning seat 2 and upward-facing bar seat 23 included in the roller component. Two sides of the reverse U-shaped bar 61 are directly put and riveted into the bar. The connection between the reverse U bar 61 and guiding shaft 4 is reached by the positioning seat 2, forming the entirety of the rear frame bar. During assembly, one can choose either to assemble the rear frame bar 6 and then install braking component 3 and roller 1, or to install roller 1 and others on the two sides of the guiding shaft 4 and then rivet the reverse U bar. The former is more convenient.

The lower part of the front and rear basket bars 5 and 6 are hinged under the front and rear parts of the bottom frame 7, or the front and rear ends of the supporting bar 71. A connecting rod 84 is hinged on the upper side of the front and rear basket bars 5 and 6, forming a connection between the front and rear basket bars 5 and 6, providing support for the two sides. The two sides of the foldable rectangle are thereby achieved; tractive action is also achieved during folding and unfolding.

Handle bars 8 in this example are foldable, including the upper U bar 81 and the lower U bar 82 that are hinged together. There is also limit switch installed, limiting the back-turn angle at below 250 degrees. The lower middle part of the U bar 82 forms the horizontal bar 821. When the handle is opened to a certain degree, the front horizontal bar 921 supports the bottom frame 7, providing support for the front. For this, front guiding rollers 822 are installed on the front horizontal bar 821. Omni-directional wheels are used for front guiding rollers 822, so that it can better create four-wheel support for the trolley. For two-wheel trolleys, one can simply fix a mat on the front horizontal bar 821, to create ground support together with rollers 1.

The handle 8 leans backward, with its middle part hinged on the mid-rear part of the connecting rod 84, creating a connection with the upper part of the side. The lower part of the handle 8 is connected to the lower part of the side through the connecting rod 85. The front end of the connecting rod 85 is hinged with the lower part of the handle bar 8. The frontal end of the connecting rod 85 is hinged with the lower part of handle bar 8, while the rear part is hinged with the supporting bar 71 on the side of the bottom frame, forming the connection during the opening and folding of handle bar 8, and also strengthening the two sides.

In addition, when pushing the trolley, one can press the handle bar 8 to make the roller 1 into a supporting point, while the front tilts upward and the trolley moves on two wheels. In this way, vibration with the ground is reduced. Besides, one can also find the best angle to push the trolley.

Figure 9:
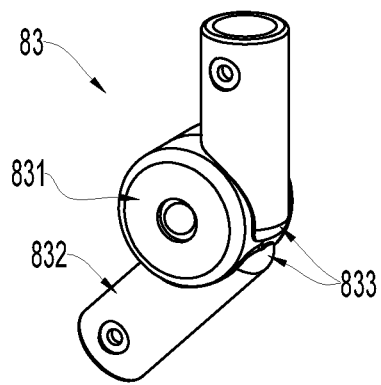
FIG. 9 shows the plastic hinge.
Figure 10:
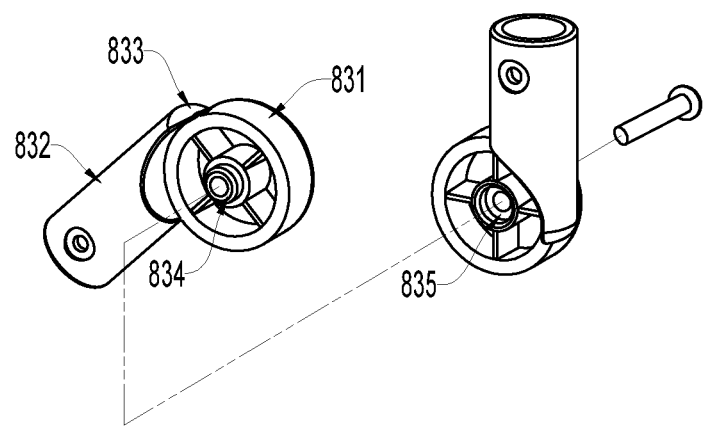
FIG. 10 is a detailed illustration of the turning of the plastic hinge.

Referring to FIGS. 9 and 10, the back-turn limit switch in this example is plastic hinge 83, which includes left and right hinges and the rivets that hold them together. The left and right hinges are rotationally symmetrical. The disc end 831 and the bar sleeve end 832 at the disc tangent are opened to contact the bottom of the disc end bar cover 833, so that limit switch against back turn is created. Of course, the left and right hinges of the plastic hinge 83 can also turn into unsymmetrical structures through two molds. In addition to rivet holes on the disc end 831, cylinder tenon 834 and cylinder mortise 831 are also placed on the neighboring surface, achieving damping function to position the U bar 81 to a certain angle and to facilitate positioning prior to assembling. This figure illustrates the asymmetrical structure of the left and right hinges.

Figure 11:
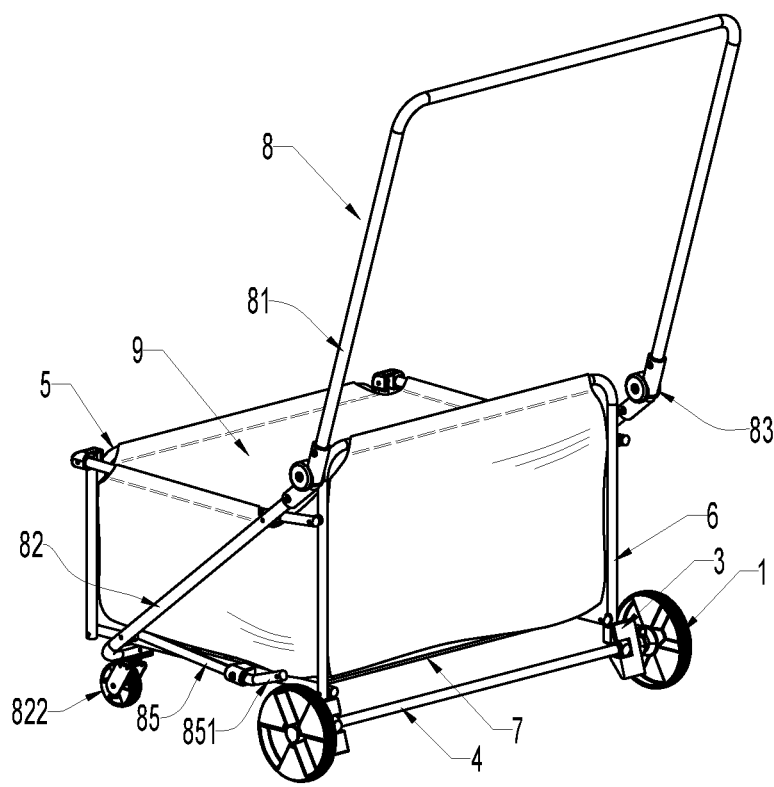
FIG. 11 is an illustration of the trolley.

Referring to FIG. 11, the bag 9 is made with flexible materials such as oxford cloth, mesh fabric and water-proof cloth that are flexible enough for the frame to fold. The bag 9's bottom is put on bottom frame 7, with two of its four edges hung on the upper part of the front and rear frame bars, or to say the short U bar 51 and the middle of the reverse U bar 61. In this figure, the other two sides are hung on two connecting rods 84, forming balanced support of the bag and making the bag 9 more smooth. In order to achieve organic connection between bag 9 and bottom basket frame, fabric tape is used on the supporting bars 71 on the two sides. Also, where connecting rod 85 and supporting rod 71 are hinged, an extended part 851 is installed, and the two sides of bag 9 are fastened on the ends of the extended part 851. During folding and unfolding, the connecting bar and extended part 851 work simultaneously to lift the edges of bag 9, to guarantee smoother operation and a better shape of an open bag.

Example 2

Figure 12:
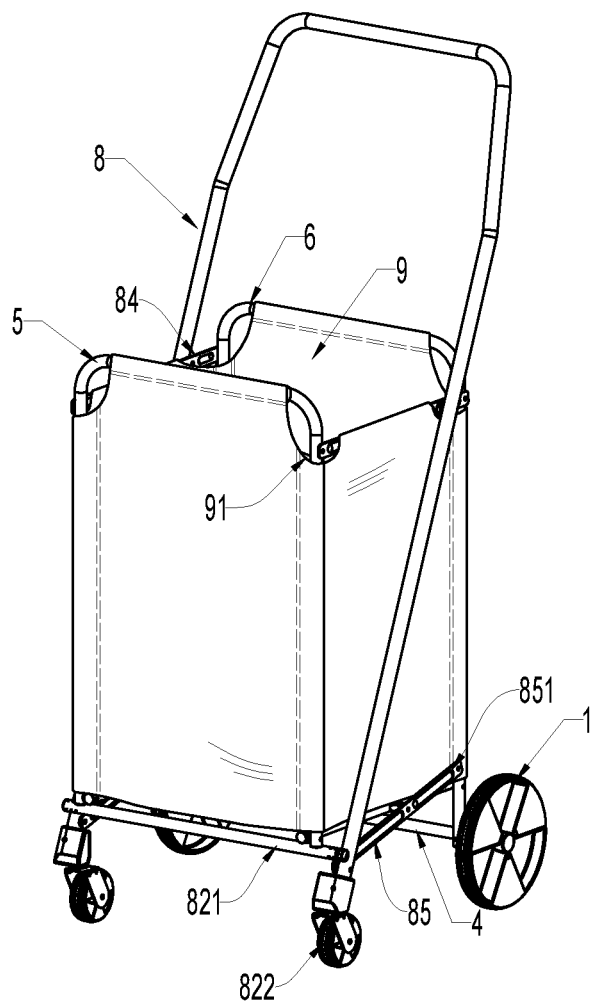
FIG. 12 is an illustration of trolley 2.
Figure 13:
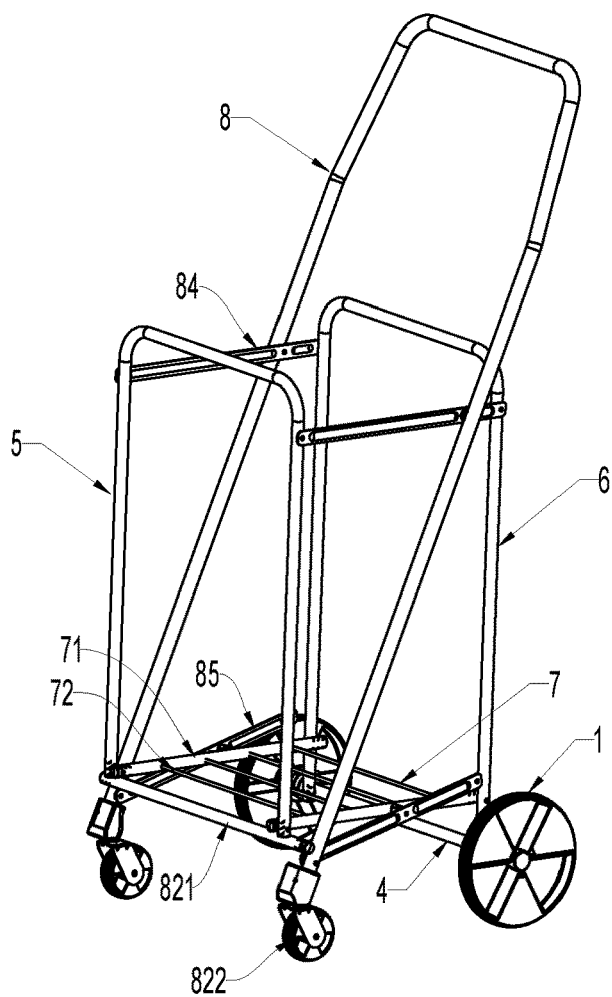
FIG. 13 is an illustration of the frame of trolley 2.
Figure 14:
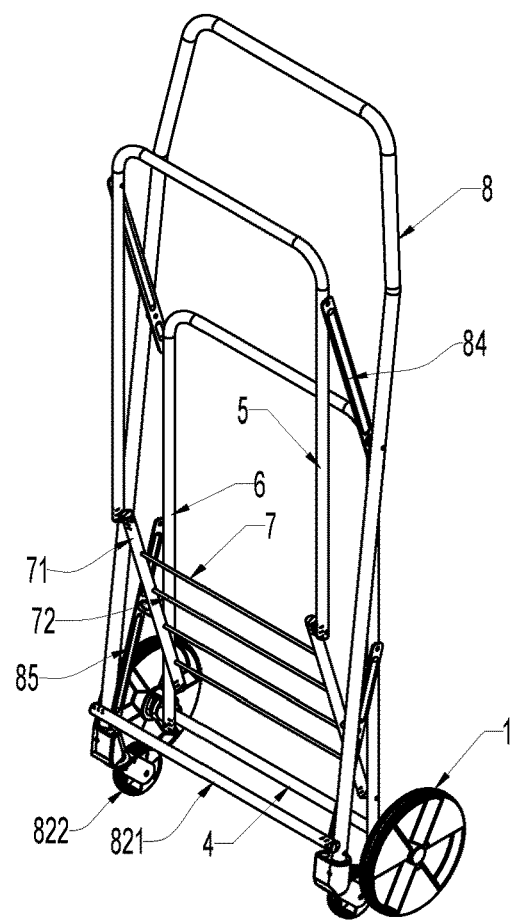
FIG. 14 is an illustration of the folding of trolley 2's frames.

Referring to FIGS. 12, 13, and 14, this is an example of a different shape of trolley, which is also the traditional shape of trolleys to cater to leisure and shopping needs. Main features of this structure are the flexible fabrics used for bag 9, improvement for the frame, and roller components with braking function, which is the rollers 1 on the two sides of the rear basket bar 6, to facilitate braking need.

Because there is no need to consider space limit, the front, rear bars 5 and 6, and the handle bar 8 of the trolley in this figure are all reverse U bars; the bottom frame 7 is in the shape of an H and the two sides are supporting bar 71 between which steel wires 72 or steel wire gauze is used. The bottom frame 7 uses the supporting bars 71, reverse U-shaped bars, and the two ends of the front and rear basket bars to hinge. The horizontal bar 821 is put under the handle bar 8 of the reverse U bar. When the trolley is opened to a certain point, it supports the bottom frame 7 with the help of the front horizontal bar 821, and the front guiding rollers 822 are installed under the handle 8. Front guiding rollers 822 can also be installed on front horizontal bar 821. For trolleys with a smaller bottom frame 7, the front guiding rollers are installed under the handle bar 8 to create a stable support. Rollers 1 on the two sides of the rear frame 6, are also located and supported on the two sides of guiding shaft 4 under the rear frame bar 6. The rollers 1 are located on the outside of the rear frame bar 6, so that the trolley is stable while pushing.

Bag 9 is in the shape of a rectangular cylinder structure, and cloth covers 91 are installed on the two edges of bag 9. The bag is installed on the parallel bars on the two sides of the front and rear bars with the help of cover 91. The bag is opened through front and rear bars 5 and 6. In addition, two sides of bag 9 are hung on the upside of the front and rear bars, or all the four sides of bag 9 are hung on the front and rear bars 5, 6 and the two connecting rods 84.

I claim:

1. A roller component comprising
a roller, positioning block and braking brake parts;
an axle sleeve is placed along an axle hole on the inner side of the roller; the outside edge of the axle sleeve is thinner on the middle and with the end part in the shape of a convex ring;
the positioning block includes an axle bed and a suspended claw and is fixed on the guide shaft through the roller's axle holes by the axle bed;
suspended claw is put on the convex ring, forming movable positioning rollers;
the braking part has connected shaft ring and pedals, the ring's aperture is the same with that of the roller, and the end of the ring is a cam surface;
the braking part is installed between the positioning blocks and rollers and the mentioned cam surface is in contact of the axle bed;
the braking part is forced to move along the axle, relieving or putting pressure to the end of the rollers cam surface;
the pedals are put on the tangent of the shaft ring and is rotated by the pedal.

2. The roller component of claim 1, further comprising:
the suspended claw of the positioning seat and the roller's convex ring share similar circular structure, and the inner part of its outside end is in the shape of a chamfer claw; the outside edge of the convex ring is also in the shape of a chamfer ring;
a fitting surface is thereby created; and
when fitting the rollers, the chamfer ring is put on the chamfer claw, forcing the latter to fit in, creating a movable positioning structure.

3. The roller component of claim 1, further comprising:
the contact surface between the axle bed and the cortex ring is the chamfer; and coordination between the cam face and the chamfer can reduce braking distance.

4. A trolley comprising:
a front bar, rear bar, bottom frame, handle bars and roller components;
the mentioned roller components are places on the two side under the rear frame bar;
the lower part of front and rear frame bars is hinged with the front and rear ends of the bottom frame;
a connecting rod is hinged on the upper parts of each side of the front and rear frame bars, thus creating support for the front and rear frame bars and a parallelogram that can be folded;
a front horizontal bar is put under the handle bar;
when the trolley is adequately opened, the front horizontal bar supports the lower part of the bottom frame; the handles lean backwards, while the middle part is hinged with the mid-rear part of the mentioned connecting rod;
a connecting rod whose front part is hinged with the lower part of the mentioned handles and rear part hinged on the side of the bottom frame;
the connection that happens during the folding and unfolding is thus created; one bag which is made with flexible fabrics;
it is put on the bottom frame; at least two of its four sides are hung on the front and rear frame bars;
guiding shafts are placed under the mentioned rear frame bar;
roller components are placed on the end parts on the two sides of the shaft;
from the outside to the inside, locating seat, braking part, and roller are installed, and the positioning part is riveted on the guiding shaft.

5. The trolley of claim 4, wherein:
the handle bars are foldable, with an upper u-shaped bar and a lower u-shaped bar;
the two us are hinged together on their ends and a limit switch against back turn is placed;
the middle part of the lower u bar constitutes the front horizontal bar that supports the bottom frame; guiding rollers are installed on the front horizontal bars.

6. The trolley of claim 5, wherein:
the limit switch is a plastic hinge that includes the left, right parts and rivets that hold them together;
the left and right part are rotationally symmetrical;
the disc end and the bar sleeve end located at the disc tangent are opened to contact the bottom of the disc end bar cover, so that the limit switch against back turn is created.

7. The trolley of claim 4, wherein:
the positioning blocks mentioned has upward facing seats; the rear frame bar consists of a reversed U bar and guiding shaft;
the reverse U bars have their two ends riveted in their seats;
the connection between the reverse U bars and guiding shafts is reached through the positioning blocks and the together they form the rear frame bars.

8. The trolley of claim 4, wherein:
the front frame bar mentioned consists of a short U-shaped bar and two vertical bars hinged on the two ends of the U bar;
the upper end of the vertical bar is hinged with the frontal part of the connecting rod, maybe with a plastic part in the middle;

the lower part of the vertical bar is hinged on the supporting shafts on each side of the bottom frame; the bottom frame mentioned is in the shape of an H, with steel wires or steel wire gauze between the supporting shafts.

9. The trolley of claim 4, wherein:

the aforementioned front, rear frame bars and handle bars are foldable U-shaped bars;

the bottom frame is in the shape of an H with supporting shafts on the two sides, with steel wires or steel wire gauze in the middle;

the bottom frame is hinged with the ends of the reverse U through the supporting shafts;

front guiding rollers are installed under the handle bars.

10. The trolley of claim 4, wherein:

the bags are in the shape of rectangular cylinders with two kinds of positioning structures: 1, cloth covers on the four edges, which are installed on the parallel bars, so that the front and rear frame bars can keep the bag open; and 2, the bag is placed on the bottom frame, and at least two of the four edges are hung on the upper side of the front and rear frame bars.

\* \* \* \* \*